(12) United States Patent
Post et al.

(10) Patent No.: US 9,924,322 B2
(45) Date of Patent: Mar. 20, 2018

(54) COMPUTING DISTANCES OF DEVICES

(71) Applicant: Square, Inc., San Francisco, CA (US)

(72) Inventors: Daniel Jeffrey Post, San Mateo, CA (US); Shuvo Chatterjee, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 364 days.

(21) Appl. No.: 13/948,871

(22) Filed: Jul. 23, 2013

(65) Prior Publication Data
US 2015/0031393 A1    Jan. 29, 2015

(51) Int. Cl.
*H04W 4/02* (2009.01)
*G06Q 30/02* (2012.01)

(52) U.S. Cl.
CPC ........ *H04W 4/025* (2013.01); *G06Q 30/0259* (2013.01); *G06Q 30/0261* (2013.01); *H04W 4/02* (2013.01)

(58) Field of Classification Search
CPC ........... G06Q 30/0259; G06Q 30/0261; G06Q 30/02; H04W 4/025; H04W 8/18; H04W 4/02; H04W 64/00; H04L 29/08657; H04L 29/08108; G01S 5/14
See application file for complete search history.

(56) References Cited

U.S. PATENT DOCUMENTS

| | | | |
|---|---|---|---|
| 8,438,066 B1 | 5/2013 | Yuen et al. | |
| 2010/0087144 A1* | 4/2010 | Korenshtein | H04B 17/318 455/41.2 |
| 2010/0135178 A1* | 6/2010 | Aggarwal | G01S 5/0205 370/252 |
| 2011/0045840 A1* | 2/2011 | Alizadeh-Shabdiz | G01S 5/02 455/456.1 |
| 2011/0090124 A1* | 4/2011 | Liu | G01S 5/0289 342/463 |
| 2011/0213652 A1 | 9/2011 | Gillen et al. | |
| 2012/0128089 A1* | 5/2012 | Tsutsui | H04B 7/0617 375/267 |
| 2012/0149390 A1* | 6/2012 | Gravely | G01S 5/14 455/456.1 |
| 2012/0252500 A1* | 10/2012 | Mitsuya | H04W 64/00 455/456.5 |

(Continued)

OTHER PUBLICATIONS

International Search Report and Written Opinion dated Nov. 25, 2014, for International Patent Application PCT/US2014/047381, filed Jul. 21, 2014.

(Continued)

*Primary Examiner* — Dinh P Nguyen
(74) *Attorney, Agent, or Firm* — Polsinelli PC

(57) ABSTRACT

Methods, systems, and apparatus, including computer programs encoded on computer storage media, for ranking devices based on a distance from a merchant device. One of the methods includes displaying, in a point-of-sale system, a listing of buyers located proximate to the point-of-sale system, the buyers having indicated using their mobile devices a desire to pursue a financial transaction in association with the point-of-sale system. The point-of-sale system determines relative distances of the mobile devices of the buyers with respect to the point-of-sale system and arranges the displayed listing in the point-of-sale system based at least in part on the determined relative distances.

20 Claims, 12 Drawing Sheets

(56) References Cited

U.S. PATENT DOCUMENTS

2013/0024018 A1 1/2013 Chang et al.
2013/0030931 A1 1/2013 Moshfeghi
2014/0123043 A1* 5/2014 Schmidt .............. G06F 3/04883
                                                               715/769

OTHER PUBLICATIONS

Liu, D. et al. *Attack-Resistant Location Estimation in Sensor Networks*. Originally published in ACM Transactions on Information and System Security (TISSEC), vol. 11 Issue 4, Jul. 2008. Retrieved from the Internet: URL<http://discovery.csc.ncsu.edu/pubs/ipsn05.pdf. Retrieved on Apr. 28, 2014. 8 pages.
Saxena, M. et al. *Experimental Analysis of RSSI-Based Location Estimation in Wireless Sensor Networks*. Published in 3rd International Conference on Communication Systems Software and Middleware and Workshops, Jan. 2008. COMSWARE 2008. pp. 503-510.
Examination Report No. 1 for Australian Patent Application No. 2014293388, dated Aug. 2, 2016.
Examiner Requisition for Canadian Patent Application No. 2,919,238, mailed Feb. 6, 2017.

* cited by examiner

COMPUTING DISTANCES OF DEVICES

TECHNICAL FIELD

This disclosure relates to computing distances of mobile devices from a particular location.

BACKGROUND

A measurement of radio signal strength, e.g. a Received Signal Strength Indicator ("RSSI"), can be used to estimate a distance of a device that is emitting the radio signal, e.g. a mobile device. Fixed radio receivers can also be used to triangulate a location of a mobile device. Mobile device locations can also be determined using Global Positioning System (GPS) signals.

SUMMARY

This specification relates to how a system can compute distances between a merchant device and nearby mobile devices. In general, the system can use radio signal strengths that are emitted by the mobile devices and that are read by other mobile devices in order to determine a distance of each mobile device from a merchant device. The distances can be used to rank customers in an order, which can facilitate processing orders at a point-of-sale system, e.g., for a cardless payment system.

As an example, a popular coffee shop may have a long line of customers waiting to pay for their orders, many of whom may wish to do so using a cardless payment system. Rather than attempting to manually match customer information to particular customers on a point-of-sale device, the point-of-sale device can instead arrange the customer information on the display based on distances computed using radio signal strengths emitted by the customers' mobile devices.

In general, one innovative aspect of the subject matter described in this specification can be embodied in methods that include the actions of receiving, by a stationary merchant device, one or more signal strengths associated with a plurality of mobile devices; computing a respective distance between each mobile device and the merchant device based at least in part on one or more of (i) signal strength as measured by the merchant device or (ii) signal strength of one or more other mobile devices as measured by each particular mobile device; and generating a ranking the plurality of mobile devices by respective computed distance between each mobile device and the merchant device. Other embodiments of this aspect include corresponding computer systems, apparatus, and computer programs recorded on one or more computer storage devices, each configured to perform the actions of the methods.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include receiving a name or picture of a respective user associated with each mobile device of the plurality of mobile devices; and displaying the received name or picture of each user associated with each mobile device in the ranking of the plurality of mobile devices. Receiving, by a stationary merchant device, one or more signal strengths associated with a plurality of mobile devices comprises receiving, from each particular mobile device, signal strength of one or more of the other mobile devices as measured by the particular mobile device. A measurement of mobile device signal strength is a measurement of strength of a radio signal emitted by the mobile device. The measurement of mobile device signal strength is a measurement of strength of a Bluetooth Low Energy signal.

In general, another innovative aspect of the subject matter described in this specification can be embodied in a point-of-sale system that includes a display and one or more computers and one or more storage devices storing instructions that are operable, when executed by the one or more computers, to cause the one or more computers to perform operations that include identifying a plurality of customers each having a mobile device; determining respective first measurements of signal strength emitted by one or more mobile devices of the plurality of mobile devices; receiving, from each particular mobile device of the plurality of mobile devices, second measurements of signal strength emitted by one or more other mobile devices as measured by the particular mobile device; computing one or more positions of each mobile device of the plurality of mobile devices based on the first measurements of signal strength and the second measurements of signal strength; computing respective distances between each customer and the point of sale system based on the one or more positions of each mobile device; and providing, on the display, a ranking of the one or more customers according to the respective distances. Other embodiments of this aspect include corresponding methods and computer programs recorded on one or more computer storage devices, each to perform the operations of the point-of-sale system.

The foregoing and other embodiments can each optionally include one or more of the following features, alone or in combination. Identifying a plurality of customers each having a mobile device comprises identifying a plurality of customers who have checked in to indicate availability to conduct a purchase transaction. Identifying a plurality of customers each having a mobile device comprises identifying one or more mobile devices that are located within a threshold distance of the point of sale system.

In general, one innovative aspect of the subject matter described in this specification can be embodied in methods that include the actions of displaying, in a point-of-sale system, a listing of buyers located proximate to the point-of-sale system, the buyers having indicated using their mobile devices a desire to pursue a financial transaction in association with the point-of-sale system; determining, by the point-of-sale system, relative distances of the mobile devices of the buyers with respect to the point-of-sale system; arranging the displayed listing in the point-of-sale system based at least in part on the determined relative distances. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include receiving an indication that a particular buyer has completed a purchase; and rearranging the displayed listing of the buyers without the particular buyer in the point-of-sale system. Determining relative distances of the mobile devices of the buyers with respect to the point-of-sale system comprises assigning a first location to the first device of the mobile devices; determining a second location of a second device of the mobile devices, wherein the second location is based at least in part on a signal strength between the first device and the second device; determining a third location of a third device of the mobile devices, wherein the third location is based at least in part on a signal strength between the first device and the third device and based at least in part on a signal strength between the second device and the third device; determining relative distances of the mobile devices based at least in part on the first location of the first device, the second location of the second device, and the third location of the third device. The actions include determining a fourth location of the third device based on a different signal strength between the first device and the third device and based on a different signal strength between the second device and the third device; computing a fourth distance between the merchant device and the fourth location, wherein the fourth distance is different than a third distance between the merchant device and the third location of the third device; determining a first weight for the third distance based at least in part on an associated measure of variability of one or more signal strengths used to determine the third distance; determining a second weight for the fourth distance based at least in part on an associated measure of variability of one or more signal strengths used to determine the fourth distance; and computing a weighted average distance based on the weighted third distance and the weighted fourth distance. The actions include determining that the third device is a fixed device; and adjusting the first weight for the third distance based on determining that the third device is a fixed device. The actions include selecting, from the plurality of devices, a fourth device; computing a third distance between the first location of the first device and a fourth location of the fourth device based on a mobile device signal strength between the first device and the fourth device, a mobile device signal strength between the second device and the fourth device, and based on a mobile device signal strength between the fourth device and the third device. Computing the third distance comprises determining a value of a y-coordinate of the fourth location based on a signal strength between the first device and the fourth device and a signal strength between the second device and the fourth device; determining an first distance between the third location and a first candidate fourth location having a positive y-coordinate based on the signal strength between the fourth device and the third device; determining an second distance between the third location and a second candidate fourth location having a negative y-coordinate based on the signal strength between the fourth device and the third device; determining a sign of the y-coordinate of the fourth location based on comparing the first distance and the second distance.

In general, one innovative aspect of the subject matter described in this specification can be embodied in methods that include the actions of receiving measurements of signal strength emitted by a plurality of devices, including a merchant device and a plurality of mobile devices; selecting, from the plurality of devices, a first device, a second device, and a third device; assigning a first location to the first device; determining a second location of the second device based at least in part on a signal strength between the first device and the second device; determining a third location of the third device based on a signal strength between the first device and the third device and based on a signal strength between the second device and the third device; obtaining a location of the merchant device; computing a respective distance between the merchant device and the first device, the second device, and the third device; and ranking the first device, the second device, and the third device by computed distance from the merchant device. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The merchant device is stationary. The merchant device is the first device, the second device, or the third device. The actions include selecting, from the plurality of devices, a fourth device; computing a third distance between the first location of the first device and a fourth location of the fourth device based on a mobile device signal strength between the first device and the fourth device, a mobile device signal strength between the second device and the fourth device, and based on a mobile device signal strength between the fourth device and the third device. The merchant device is the fourth device. Computing the third distance comprises determining a value of a y-coordinate of the fourth location based on a signal strength between the first device and the fourth device and a signal strength between the second device and the fourth device; determining an first distance between the third location and a first candidate fourth location having a positive y-coordinate based on the signal strength between the fourth device and the third device; determining an second distance between the third location and a second candidate fourth location having a negative y-coordinate based on the signal strength between the fourth device and the third device; determining a sign of the y-coordinate of the fourth location based on comparing the first distance and the second distance. The actions include determining a fourth location of the third device based on a different signal strength between the first device and the third device and based on a different signal strength between the second device and the third device; computing a fourth distance between the merchant device and the fourth location, wherein the fourth distance is different than a third distance between the merchant device and the third location of the third device; determining a first weight for the third distance based at least in part on an associated measure of variability of one or more signal strengths used to determine the third distance; determining a second weight for the fourth distance based at least in part on an associated measure of variability of one or more signal strengths used to determine the fourth distance; and computing a weighted average distance based on the first weight for third distance and the second weight for the fourth distance. The actions include determining that the third device is a fixed device; and adjusting the first weight for the third distance based on determining that the third device is a fixed device.

In general, another innovative aspect of the subject matter described in this specification can be embodied in a point-of-sale system that includes a display and one or more computers and one or more storage devices storing instructions that are operable, when executed by the one or more computers, to cause the one or more computers to perform operations that include identifying one or more customers each having a mobile device; determining respective distances between each customer and the point of sale system; and providing, on the display, a ranking of the one or more customers according to the respective distances. Other embodiments of this aspect include corresponding methods and computer programs recorded on one or more computer storage devices, each to perform the operations of the point-of-sale system.

The foregoing and other embodiments can each optionally include one or more of the following features, alone or in combination. Identifying a plurality of customers each having a mobile device comprises identifying a plurality of customers who have checked in to indicate their desire to pursue a purchase transaction with the point-of-sale system. Identifying a plurality of customers each having a mobile device comprises identifying one or more mobile devices that are located within a threshold distance of the point of sale system. Determining distances between each customer and the point-of-sale system comprises assigning a first location to a first device of the mobile devices; determining a second location of a second device of the mobile devices, wherein the second location is based at least in part on a signal strength between the first device and the second device; determining a third location of a third device of the mobile devices, wherein the third location is based at least in part on a signal strength between the first device and the third device and based at least in part on a signal strength between the second device and the third device; determining respective distances between each customer and the point-of-sale system based at least in part on the first location of the first device, the second location of the second device, and the third location of the third device. The operations include determining a fourth location of the third device based on a different signal strength between the first device and the third device and based on a different signal strength between the second device and the third device; computing a fourth distance between the merchant device and the fourth location, wherein the fourth distance is different than a third distance between the merchant device and the third location of the third device; determining a first weight for the third distance based at least in part on an associated measure of variability of one or more signal strengths used to determine the third distance; determining a second weight for the fourth distance based at least in part on an associated measure of variability of one or more signal strengths used to determine the fourth distance; and computing a weighted average distance based on the weighted third distance and the weighted fourth distance. The operations include determining that the third device is a fixed device; and adjusting the first weight for the third distance based on determining that the third device is a fixed device. The operations include selecting, from the plurality of devices, a fourth device; computing a third distance between the first location of the first device and a fourth location of the fourth device based on a mobile device signal strength between the first device and the fourth device, a mobile device signal strength between the second device and the fourth device, and based on a mobile device signal strength between the fourth device and the third device. Computing the third distance comprises determining a value of a y-coordinate of the fourth location based on a signal strength between the first device and the fourth device and a signal strength between the second device and the fourth device; determining an first distance between the third location and a first candidate fourth location having a positive y-coordinate based on the signal strength between the fourth device and the third device; determining an second distance between the third location and a second candidate fourth location having a negative y-coordinate based on the signal strength between the fourth device and the third device; determining a sign of the y-coordinate of the fourth location based on comparing the first distance and the second distance.

Advantages may include one or more of the following. Ranking the customers by distance from the point-of-sale device facilitates the speed of processing the customers' orders and eases the process of matching a customer to customer information on a point-of-sale display. This in turn which reduces customer wait times and gives customers a more positive experience with the merchant. The merchant can thus process more orders in a particular amount of time, resulting in increased business. Using signal strengths between devices can provide a robust way to compute distances, even when some signal strength data received from the devices is missing or inaccurate.

BRIEF DESCRIPTION OF THE DRAWINGS

Like reference numbers and designations in the various drawings indicate like elements.

DETAILED DESCRIPTION

Figure 1:
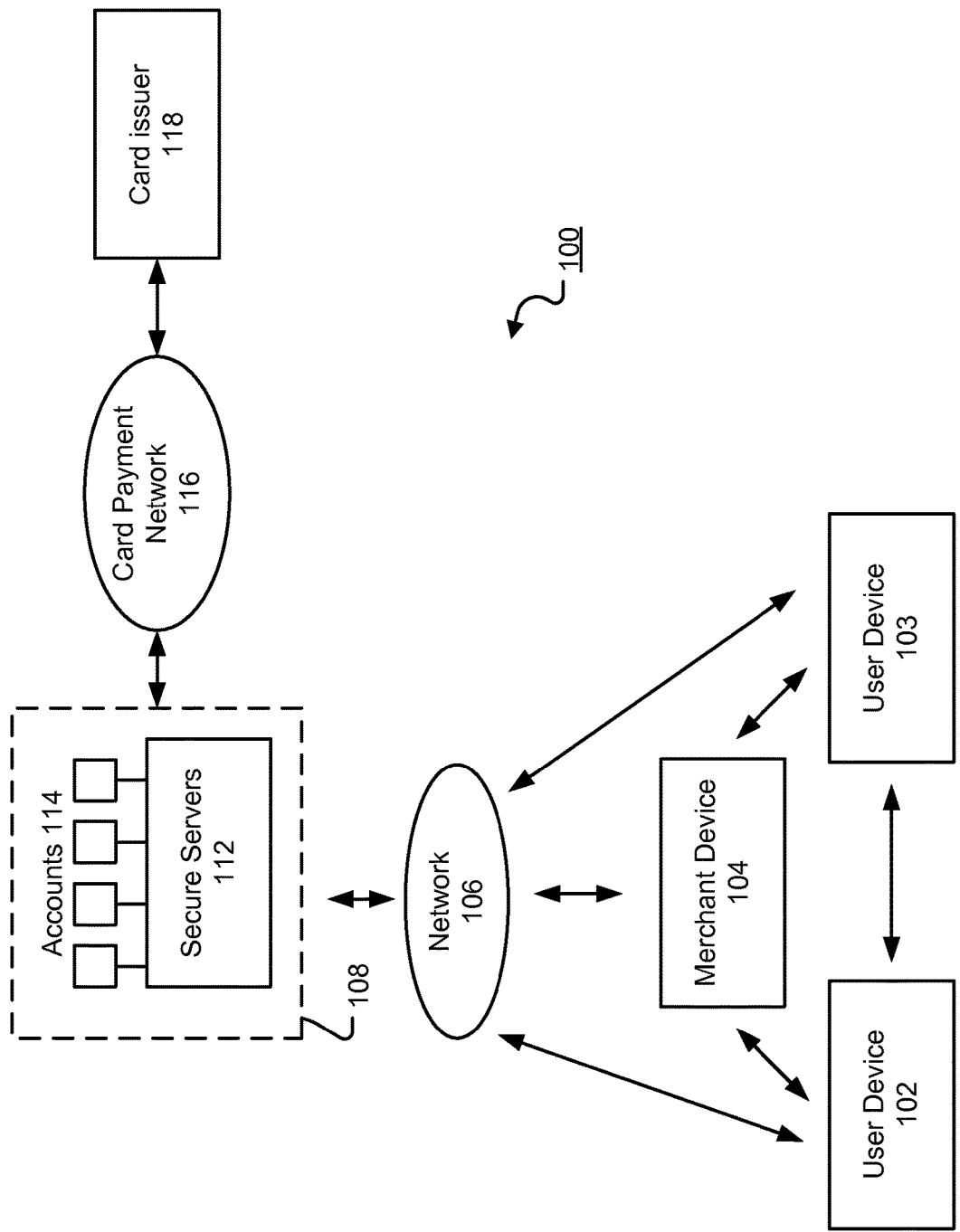
FIG. 1 is a schematic illustration of the architecture of an example system.

A system can use radio signal strength measurements measured by one or more merchant devices and radio signal strength measurements measured by mobile devices to compute a distance of each mobile device from a merchant device. A merchant device can then display customer information arranged by distance from the merchant device to facilitate processing the orders of customers waiting in line.

In this specification, the radio signal strength measurement can include any appropriate indicator of radio signal strength, e.g. decibels, a signal to noise ratio, or RSSI, to name a few examples. The radio signals emitted by the user devices can be part of any appropriate standard for mid to short-range radio signal communications, including NFC, Bluetooth, Bluetooth Low Energy, to name a few examples.

The examples below will relate to computing distances between a merchant device and mobile devices that are participating in a cardless payment system. However, the techniques described are not limited to calculating distances from a merchant device, ranking user devices by calculated distances, or to systems that process payment transactions. Other systems can also compute such distances of mobile devices from a reference computing device using measured radio signal strengths as measured by the mobile devices. In such systems the reference device takes the place of the merchant device. In addition, the techniques described can be implemented by other systems capable of communicating over other wireless communication technologies having similar broadcast ranges.

A payment service system allows a user (also called a customer or payer) to purchase items from a merchant while physically present at the merchant, e.g., at the point of sale, or online, e.g. through a merchant's website. Some payment service systems process cardless payment transactions. A cardless payment transaction is one where a user conducts the transaction with a merchant at a point of sale or online by using a financial account without physically presenting or otherwise providing information about a payment card to the merchant at the point of sale. In fact, the merchant need not receive any details about the financial account, e.g., the credit card issuer, credit card number, and the like is not provided to the merchant.

From the user's perspective, the user first signs up for an account with the payment service system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the payment service system.

To conduct cardless payment transactions with a merchant at the point of sale, the user can give consent to perform a cardless payment transaction with the merchant. After the user gives consent, the merchant can, without using a physical payment card, charge (in the case of credit cards) or debit (in the case of debit cards) the user's financial account for items the user wants to buy. Because the user's payment card is already on file with the cardless payment system, the user does not need to physically present a credit card to the merchant.

FIG. 1 is a schematic illustration of the architecture of an example system 100. The overall system 100 includes two user devices 102 and 103, a merchant device 104, and a payment service system 108 connected to a network, e.g., the Internet 106. The user device 102 is a computing device capable of running software applications. For example, the user device 102 can be a desktop computer, laptop computer, smartphone, or tablet computer. The merchant device 104 is also a computing device, capable of processing transactions. The merchant device 104 can be a mobile device, a server, a desktop computer, a laptop computer, a dedicated point-of-sale system, or other data processing apparatus. By using the payment service system 108, the user device 102 and merchant device 104 can conduct a payment transaction, for example a cardless or online payment transaction.

The merchant device 104 can communicate with the payment service system 108 using the network 106. Optionally, the user devices 102, 103 can also communicate with the payment service system 108 using the network 106. In addition, the merchant device 104 and user devices 102, 103 can communicate directly with one another and with the merchant device 104 using a variety of communication technologies, e.g. near field communication (NFC), Bluetooth, or Bluetooth Low Energy (BLE) technologies.

The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user can be provided to the merchant at the point of sale so that the merchant can compare the photo to the person. In addition, the payment service system 108 can require a personal identification number (PIN) to be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
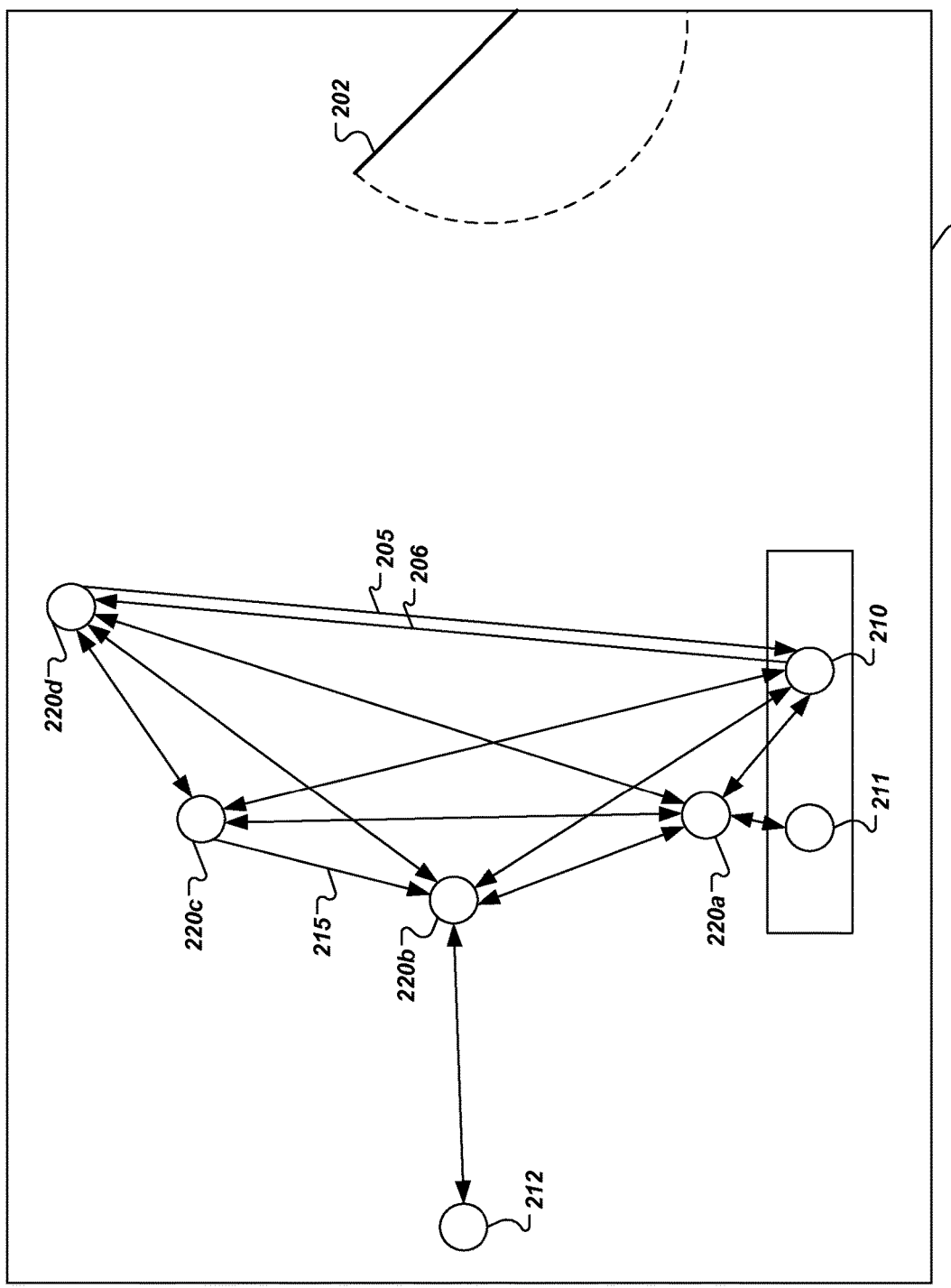
FIG. 2 is an overhead view that illustrates customers in line at a merchant's place of business.

FIG. 2 is an overhead view that illustrates customers in line at a merchant's place of business. Customer orders are processed by one or more merchant devices 210 and 211. The merchant devices 210 and 211 can be a fixed or stationary, point-of-sale devices, e.g. on a counter top, or the merchant devices 210 and 211 can be mobile devices.

FIG. 2 illustrates the merchant's place of business including space 201 having a door 202. Customers will generally assemble in a line or queue to wait for their orders to be processed by an agent of the merchant operating a merchant device, e.g., merchant device 210.

Each customer has in his or her possession a mobile user device 220*a-d* and each customer can provide payment to the merchant using an application installed on his or her mobile device that can communicate with a cardless payment system.

The merchant device 210 can measure the radio signal strength emitted from each mobile device 220*a-d*. For example, the merchant device 210 can measure the radio signal strength 205 being emitted by user device 220*d*. The radio signal emitted from a user device will generally include a unique identifier that can be used to distinguish a particular user device from other user devices. The unique identifier will generally not include personally identifying information about the user, and may be updated on a frequent and rotating basis to mitigate the risk of spoofing or fraud.

The merchant device 210 can measure the radio signal strength for user devices that are emitting a detectable radio signal or for user devices that are located within a particular distance of the merchant device. In some implementations, user devices "check in" with the merchant device 210 to indicate their willingness or desire to pursue a payment transaction with the merchant device, which may be a cardless payment transaction. For example, a customer can check in with a merchant device by interacting with a user application installed on a user device that then communicates with a cardless payment system to indicate the customer's willingness to conduct a payment transaction.

Checking in may be an automatic process that is triggered when a user device is within a particular radius of the merchant. For example, a user device can detect that the user device is within a particular distance from the location of a merchant's place of business. The user device can then check in by communicating directly with a cardless payment system to notify the system of the user device's proximity to the merchant. The cardless payment system can then communicate an indication of the user device's presence to the merchant device 210 of the merchant. The cardless payment system may also communicate other customer information, e.g., a profile picture and name of the user, to the merchant device 210 upon being notified of the user device's proximity to the merchant. A user device can also check in by communicating directly with a merchant device 210, e.g. by providing a BLE token to the merchant device 210. The merchant device 210 may then communicate the token to the cardless payment system to obtain other information about the user, e.g. a profile picture and a name of the user. "Checking in" may thus refer to the customer's action through a user application to indicate availability to conduct a payment transaction or to communication by the user device of such an indication to the cardless payment system or to the merchant device, as the context requires.

Checking in with a merchant allows a merchant application installed on the merchant device 210 to display an option to charge the user's financial account using a cardless payment transaction. In essence, checking in constitutes a consent by the user to conduct a cardless transaction with the merchant. This consent differs from actual authorization of the transaction, which the user would provide, e.g., verbally, upon learning the amount of the transaction.

Checking in can also constitute a consent by the user to have radio signal strength of a user device in possession of the user to be measured by the merchant device 210 and by other user devices that are nearby or that have also checked in with the merchant device 210. Checking in can also constitute a consent by the user that the merchant device 210 can cause the user's device to measure and report the radio signal strength of the merchant device 210 and other user devices that are nearby or that have also checked in with the merchant. For example, the user device 220*d* can measure the radio signal strength 206 being emitted by the merchant device 210, and the user device 220*b* can measure the radio signal strength 215 emitted from user device 220*c*. Similarly, each other user device can measure the radio signal strength emitted from each other user device, indicated by double headed arrows in FIG. 2.

The merchant device 210 can also query other stationary merchant devices, e.g., merchant device 211, for measurements of the radio signal strength emitted by the user devices 220*a-d*. The merchant device 210 can also query the user devices 220*a-d* for measurements of the radio signal strength emitted by other user devices 220*a-d*, other merchant devices, e.g., the merchant devices 210 or 211, and other fixed location beacons, e.g. fixed location beacon 212. For example, the fixed location beacon 212 can be a fixed BLE device that emits a signal having a unique identifier.

The merchant device 210 can then determine a distance of each user device 220*a-d* from the merchant device 210 using the obtained measurements of radio signal strength. The merchant device 210 can use the distances to rank the user devices by distance.

Figure 3:
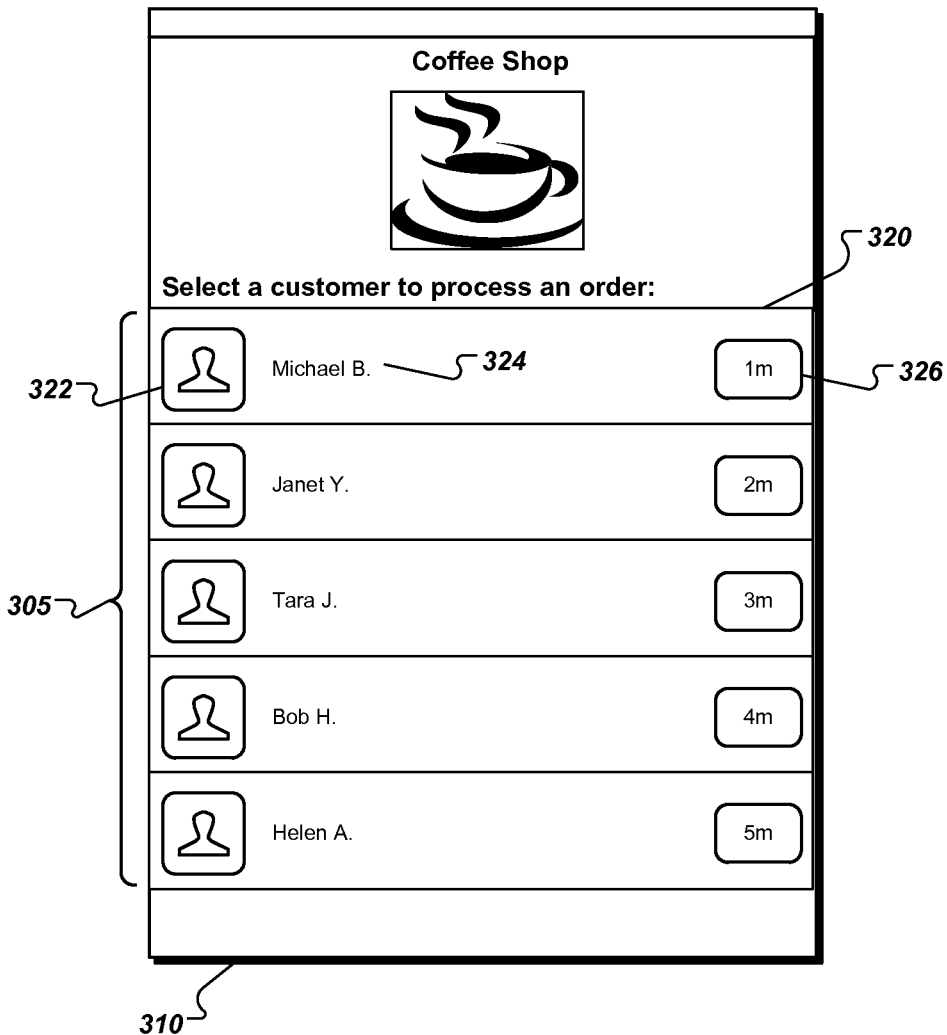
FIG. 3 is diagram of an example view of a user interface of an application installed on a merchant device.

FIG. 3 is diagram of an example view of a user interface 310 of an application installed on a merchant device. The user interface 310 includes a presentation of a ranking 305 of users according to a distance between a user device of each user and the merchant device. The distance can be computed based on a radio signal strength measured by the merchant device for each user device and based on the radio signal strength as measured between the user devices. Computation of the distances of the user devices from the merchant device based on radio signal strengths among devices will be described below in more detail with reference to FIG. 4.

The presentation includes a representation 320 for each user, e.g. each user who has checked in with the merchant. The representation 320 includes a user's profile picture 322, a user name 324, and an indication of a distance 326 of the user device from the merchant device.

A user operating the merchant device can use the user interface 310 to process orders placed by customers, e.g. by selecting each user from the ranking 305. The user operating the merchant device can then enter items selected by the user and then select an option that causes the merchant device to process the transaction, for example, as a cardless payment transaction that accesses the user's account.

After conducting the payment transaction for a particular user, the merchant device can remove the user's mobile device from consideration for future ranking by distance. In other words, the merchant device can flag an identifier of the user's mobile device to indicate that the user's payment transaction is finished and the user's mobile device should not be ranked with other user devices, even if currently located very near the merchant device. The merchant device can then automatically update the displayed listing of remaining customers. The merchant device may also recompute distances between each mobile device and the merchant device, e.g. by receiving new signal strength measurements.

Figure 4:
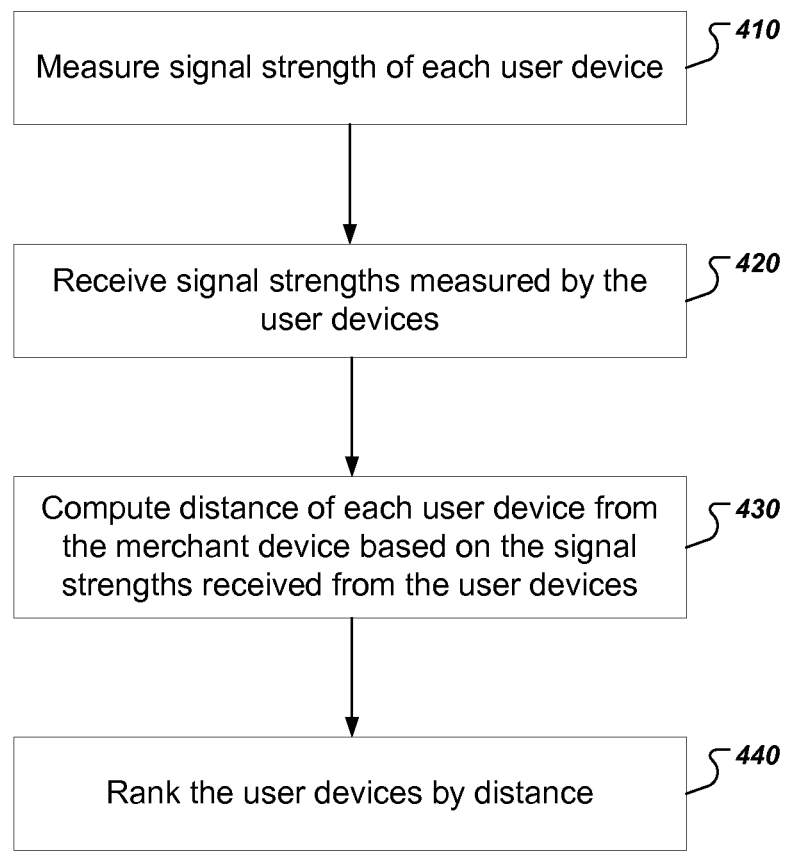
FIG. 4 is a flow chart of an example process for ranking user devices by distance.

FIG. 4 is a flow chart of an example process for ranking user devices by distance. In general, a merchant device can measure signal strength received from mobile user devices and can receive signal strength as measured by the mobile user devices. The merchant device and the user devices will generally measure signal strength of the same wireless communication standard, e.g. Bluetooth LE. The merchant device can then compute distances of the user devices from the merchant device and may rank the user devices by the computed distances. The process will be described as being performed by a merchant device, although the various steps of the process could also be allocated to multiple computers in a computer system in one or more locations. For example, a merchant device can provide the signal strength measurements over the Internet to a computer system and then receive the distances computed by the computer system.

The merchant device measures a radio signal strength of each user device (410). For example, the merchant device can measure a radio signal strength emitted by user devices that are within a particular radius of the merchant device or user devices that have checked in with the merchant device.

The merchant device receives signal strengths measured by the user devices (420). Each user device can have software installed that measures the signal strength emitted by other nearby devices. The software may be a part of a user device operating system or it may be a process that runs as part of a user application installed on the user device. The software can measure and store the signal strength with a device identifier of a device emitting the signal. The software can also maintain a unique identifier of the user device to be read by other nearby user devices.

The software on the user devices can also cause the user device to measure a signal strength emitted by the merchant device, e.g. a merchant device nearby or a merchant device that the user device has checked in with. The merchant device signal can also have an associated unique identifier that can be read and stored by each user device.

The merchant device can communicate with the user devices to request the stored or current signal strengths and associated device identifiers as collected by each user device. The merchant device can communicate directly with the user devices using wireless short-range communication technologies, e.g. Bluetooth or Bluetooth Low Energy, or the merchant device can communicate with the user devices over an internal network, e.g. a wireless network hosted by the merchant, or over the Internet. In response, the user devices can transmit the signal strengths and associated device identifiers to the merchant device. In some implementations, the devices also measure and report a measure of signal strength variability for each reported signal strength, which can be used as an indication of reliability when computing distances. In some implementations, the user devices transmit signal strengths and associated variability measurements that were measured within a recent time period, e.g. within the last 30 seconds.

In general, the merchant device can convert between a signal strength and a distance using conventional techniques. In some implementations, the merchant device computes a distance d based on an RSSI value as measured by a user device according to:

$$d = A^{-\frac{RSSI+B}{C}},$$

where A, B, and C are empirically chosen constants.

In this specification, where it is described that the merchant device can use numerical values that represent the signal strength, the merchant device can equivalently use numerical values that represent the corresponding distance and vice versa. The merchant device can for example receive numerical values that represent signal strength and convert all of the signal strength values to numerical values that represent distance before doing further calculations. The merchant device may also compute all or a portion of the calculations described below using numerical values that represent signal strength. Some or all of the conversions between signal strength and distance may also be performed by the user devices before providing the values to the merchant device.

The merchant device receives the measured signal strengths from the user devices and can store the signal strengths along with an indication of a direction of the signal, or equivalently, an indication of which device measured the signal. For example, if the merchant receives a radio signal strength 6.2 of device A as seen by device B, the merchant device can record "AB: 6.2" to indicate that the signal emitted by device A and measured by device B had a value of 6.2. The merchant device may perform error correction or range checking on the received signal strengths and eliminate weak, unreliable, or out of range signal data.

The merchant device computes a distance of each user device from the merchant device based on the signal strengths received from the user devices (430). In general, the merchant device can use the signal strengths received from the user device to compute one or multiple locations of the user devices. Based on the computed locations, the merchant device can compute distances of the user device from the merchant device. Computation of distances of the user devices from the merchant device based on signal strengths will be described in more detail below with reference to FIGS. 5-7.

The merchant device ranks the user devices by distance (440). After computing a distance between each user device and the merchant device, the merchant device can rank the user devices by distance and present the ranking of the user devices on a display device associated with the merchant device.

The merchant device can "refresh" the ranking of user devices at particular intervals, e.g. every 10, 20, or 30 seconds so that the ranking of users presented on the merchant device is current and reflects a current order of customers in line at the merchant's place of business.

Figure 5:
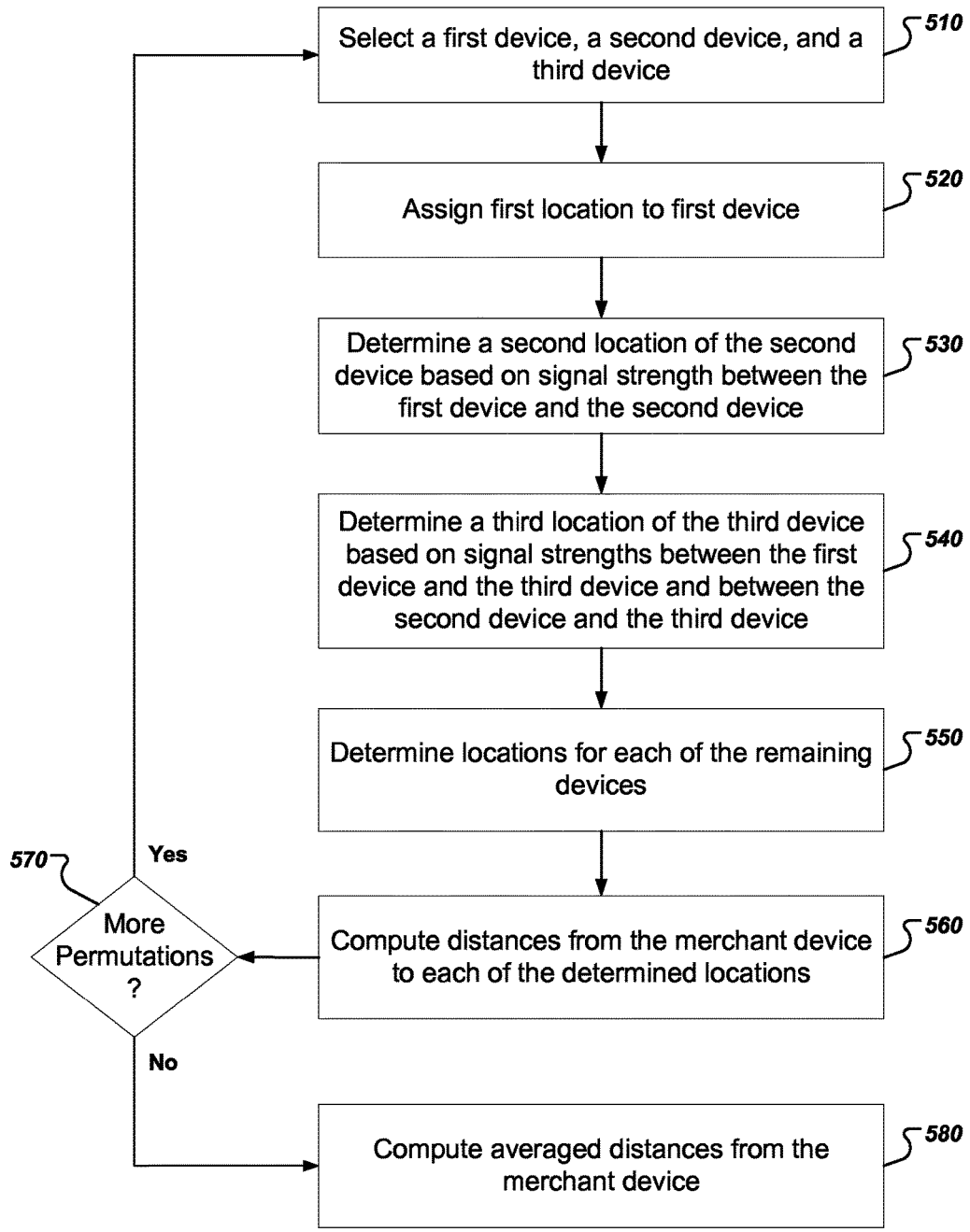
FIG. 5 is a flow chart of an example process for computing distances based on signal strength measurements between devices.

FIG. 5 is a flow chart of an example process for computing distances based on signal strength measurements between user devices. In general, a merchant device receives signal strengths as measured by a plurality of user devices and at least one merchant device. From each particular user device, the merchant device receives at least one measurement of signal strength from another user device or the merchant device as measured at that particular user device. The merchant device may receive a plurality of measurements of signal strength, each measurement being a measurement of signal strength of a different user device of the plurality of user devices, as measured at that particular user device. The merchant device can compute the distances by iterating over, from the plurality of devices, different permutations of three selected reference devices that are used to compute locations for the other devices, i.e. the fourth through Nth devices. The merchant device can then use the computed locations to determine a distance between each device and the merchant device.

The merchant device selects a first device, a second device, and a third device (510). In some implementations, the merchant device is not treated differently from the user devices when selecting the three reference devices. In other words, the merchant device can be the first device, the second device, the third device, or none of the three reference devices. The merchant device assigns a first location to the first device (520). The merchant device can define any appropriate x and y coordinates as a starting point for the first location. In some implementations, the merchant device assigns the coordinates (0, 0) for the first location.

The merchant device determines a second location of the second device based on a signal strength between the first device and the second device (530). The merchant device can assign the second location of the second device at any appropriate coordinates that match a distance computed from a signal strength between the first device and the second device. For example, the merchant device can convert a signal strength emitted by the second device as measured by the first device into a distance. Similarly, the merchant device can convert a signal strength emitted by the first device as measured by the second device into a distance. The merchant device can also combine the two signal readings, e.g. by computing an average, and convert the combined value into a distance.

In this specification, a signal strength described as being "between" two devices encompasses a single signal strength measurement received by one device from another as well as any appropriate combination of multiple signals strengths received by the two devices from each other in either direction. Situations in which a particular signal strength measurement has a particular direction for a particular calculation will be apparent from the context.

Figure 6A:
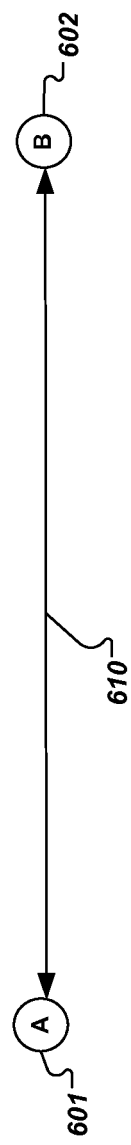
FIGS. 6A-6E illustrate determined locations of user devices.

FIG. 6A is a diagram of a determined second location. In FIGS. 6A-6E, locations of user devices are represented as nodes, and the signal strengths between the devices are represented as edges between the nodes. The first node, "A", is at the first location 601. The second node, "B," is at the second location 602, which is determined by a distance $d_{AB}$ 610 derived from the signal strength between the first device and the second device. In this example, the first location 601 is considered to be the origin at coordinates (0, 0), and the second location 602 is considered to be at coordinates ($d_{AB}$, 0).

The merchant device determines a third location of the third device based on signal strengths between the first device and the third device and between the second device and the third device (540). The merchant device can compute two distances, d1 and d2, from the corresponding signal strengths between the first device and the third device and from the second device and the third device. The merchant device can then determine the third location from where these distances intersect.

Figure 6B:
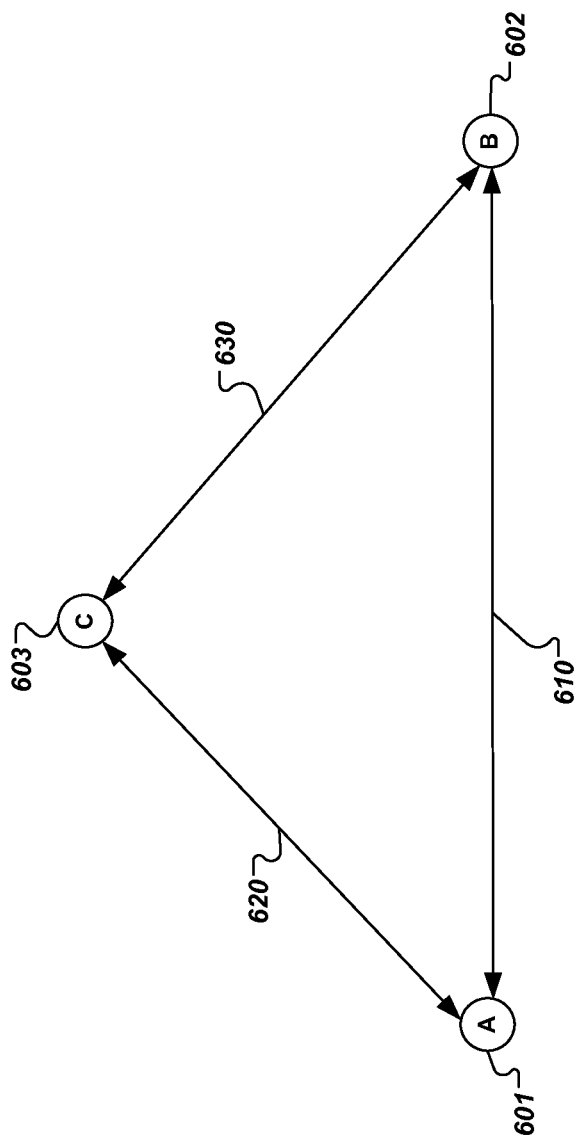

FIG. 6B is a diagram of determined third location. The third node, "C1," is at the third location 603 at the intersection of a distance derived from the signal strength 620 between the first device and the third device, and the distance 630, derived from the signal strength between the second device and the third device. In general, the distances 620 and 630 will intersect at two locations. The merchant device can choose one of the locations. In this example, the third location 603 is chosen such that the y-coordinate of the third location 603 is positive.

Given $d_{AB}$, a distance computed from the signal strength between the first device and the second device, $d_{AC}$, a distance computed from the signal strength between the first device and the third device, and $d_{BC}$, a distance computed from the signal strength between the second device and the third device, the merchant device can compute the coordinates ($x_3$, $y_3$) of the third location 603 according to:

$$x_3 = \frac{d_{AB}^2 + d_{AC}^2 - d_{BC}^2}{2 \times d_{AB}}, \text{ and}$$

$$y_3 = \sqrt{|(d_{AC}^2 - x_3^2)|}.$$

In some implementations, the merchant device computes two different values for ($x_3$, $y_3$) based on the direction of the signal strengths. The merchant device can then average or otherwise combine the two different values of ($x_3$, $y_3$) for computing a distance between the third device and the merchant device.

Figure 6C:
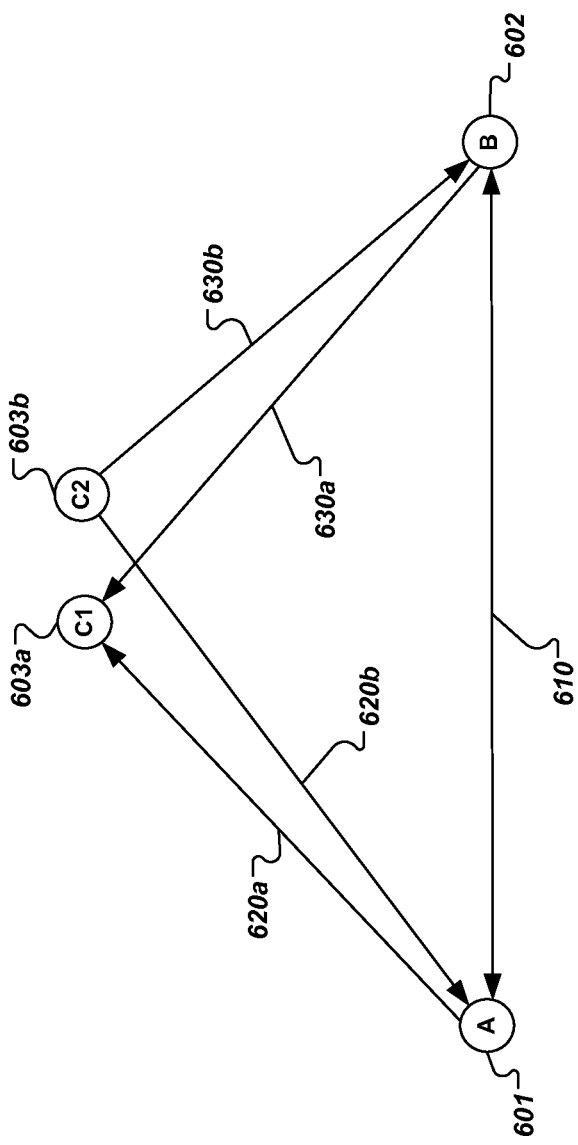

FIG. 6C is a diagram of two determined third locations. In this example, the merchant device computes a first location 603a of the third device and a second location 603b of the third device. The first location 603a of the third device is based on signal strengths 620a and 630a received by the third device. The second location 603b of the third device is based on signal strengths 620b and 630b emitted by the third device and received by the first device and the second device.

Because the signal strength measurements will routinely be different between two nodes based on direction, the third device will be associated with two different locations, 603a and 603b. The merchant device determines locations for each of the remaining devices (550). Referring back to FIG. 5, after the merchant device has determined at least one location for each of the three reference devices, the system can proceed to determine locations for the remaining, fourth through Nth, devices. In general, the merchant device can determine a location for a remaining kth device using signal strengths between the first location 601 and the second location 602 and determining a location where the corresponding distances intersect.

For the reference third device, the system can arbitrarily choose a sign, either positive or negative, for the y-coordinate to represent one of the two intersections. However, for locations of the fourth through Nth devices, the system can determine an appropriate sign for the y-coordinate based on a signal strength between each kth device and the reference third device. Determining a sign for the y-coordinate of a kth device will be described in more detail below with reference to FIG. 7.

The merchant device will have computed locations of each of the mobile devices with respect to the three chosen reference nodes. Furthermore, some devices may have multiple locations based on asymmetric signal strength measurements as recorded by the devices.

Figure 6D:
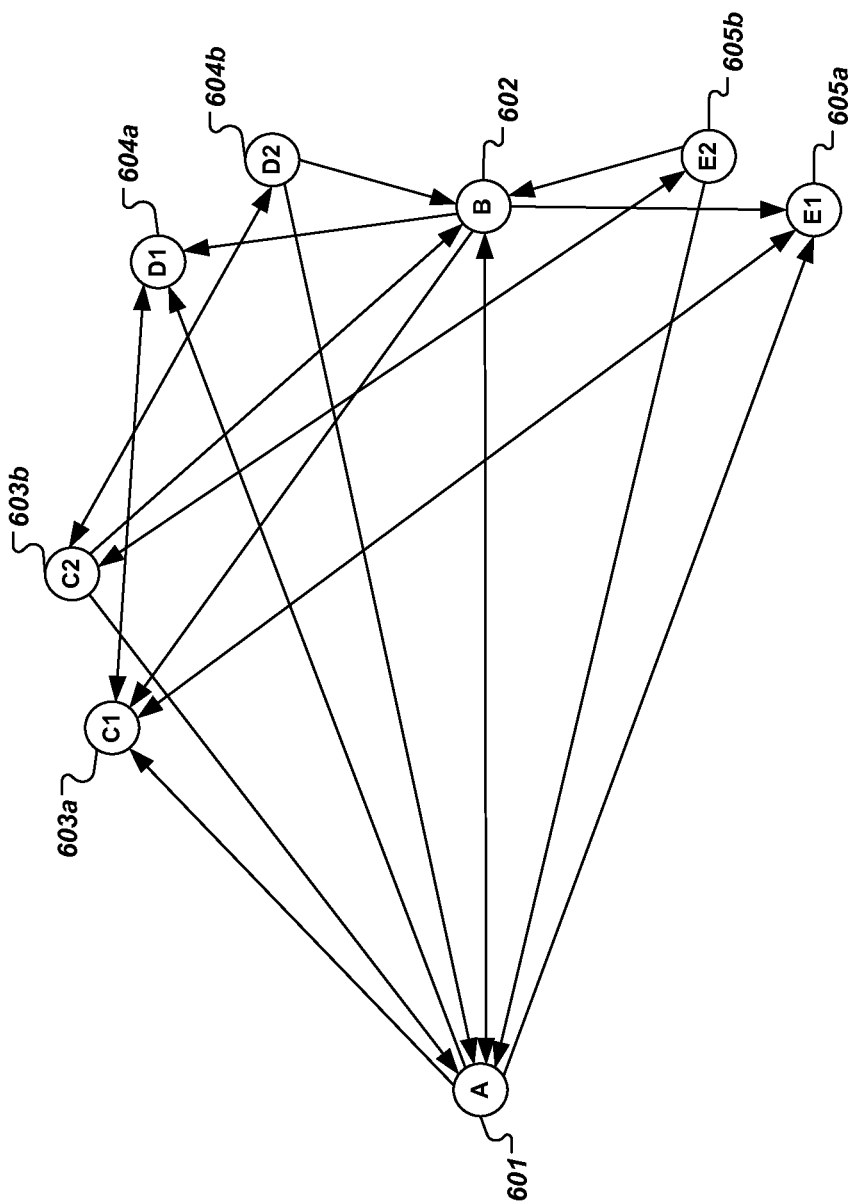

FIG. 6D illustrates example determined locations of devices. Devices "A," "B," and "C," are the chosen reference devices, and the merchant device has determined locations for devices "D," and "E" using the three reference devices. Devices "C," "D," and "E" each have two locations due to asymmetric signal strength measurements as reported by the user devices.

The merchant device computes distances from the merchant device to each of the determined locations (560). The merchant device will obtain one or more locations of the merchant device, e.g., "E1" and "E2," and compute distances from each of the determined locations of the user devices, e.g., "A," "C1," "C2," "D1," "D2," and "B," to one of the one or more merchant device locations.

In the example in 6D, the merchant device is device "E," for which the merchant device has determined a first location 605a and a second location 605b. In some implementations, in the case that there are multiple locations of the merchant device, the system computes distances for corresponding locations based on the direction of the measured signal. In other words, if location 605a was determined using signal strengths of reference devices "A" and "B" as measured by device "E," the merchant device will determine distances from the location 605a to those locations that were also determined by signal strength measured by those corresponding devices. Thus, the merchant device will compute the distance between the location 605a, "E1," and the location 604a, "D1," because both locations were determined using signal strength emitted by the reference devices "A" and "B." Similarly, if location 605b was determined using signal strengths emitted by device "E," and measured by reference devices "A" and "B," the merchant device can determine distances from the location 605b to those locations that were also determined by signal strength emitted by those corresponding devices and measured by reference devices "A" and "B", e.g. the location 604b, "D2."

The first location 605a of the merchant device was determined using signal strength received from the first device and the second device. Thus, the merchant device can compute distances from the first location 605a to locations for devices that were also determined using signal strength received by those devices, in other words, from the location 605a to the location 603a for node "C1," and from the location 605a to the location 604a for node "D1."

The second location 605b of the merchant device was determined using signal strength emitted by the merchant device to the first device and the second device. Thus, the merchant device can compute distances from the second location 605b to locations for devices that were also determined using signal strength emitted by those devices, in other words, from the location 605b to the location 603b for node "C2," and from the location 605b to the location 604b for node "D2."

In some implementations, the merchant device also computes distances to the reference locations of the first device and the second device. In other words, the system will also compute distances between the location 605a and the location 601, and the location 605a and the location 602, as well as distances between the location 605b and the location 601, and the location 605b and the location 602.

Figure 6E:
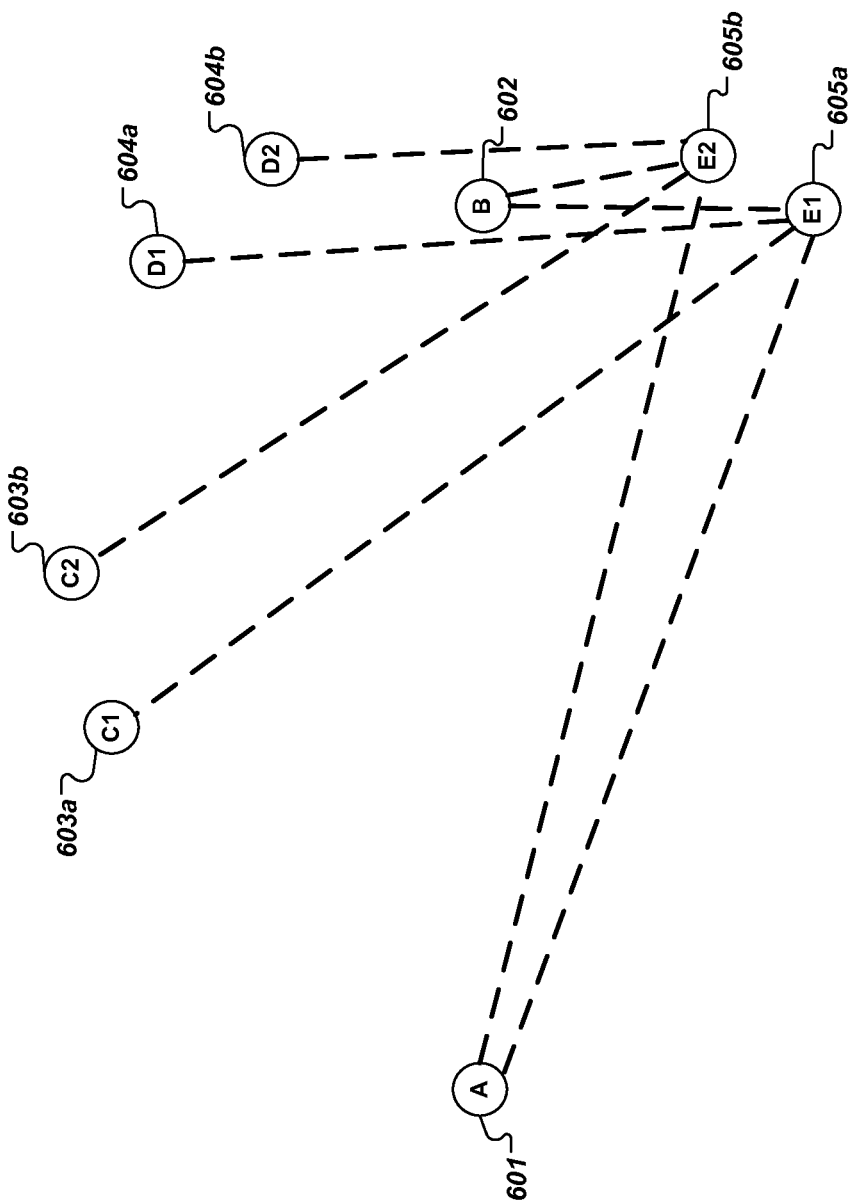

FIG. 6E illustrates distances calculated from determined locations. TABLE 1 summarizes the distances calculated.

TABLE 1

| LOCATIONS | DISTANCE (M) |
|---|---|
| E1-A | 5.1 |
| E1-B | 1.0 |
| E1-C1 | 5.0 |
| E1-D1 | 3.2 |
| E2-A | 5.3 |
| E2-B | 0.8 |
| E2-C2 | 4.8 |
| E2-D2 | 2.7 |

The merchant device determines whether more permutations of the devices remain (570). In general, the merchant device can increase the accuracy of the distance calculations by iterating through all permutations of the selected three reference devices. For example, instead of devices "A," "B," and "C" being the three reference devices, the merchant device may choose "A," "B," and "D." If more permutations remain, the merchant device computes an additional set of distance calculations similar to those shown in TABLE 1 using three difference reference devices (branch to 510). The merchant device can either keep adding distance measurements to an aggregate set of distance measurements, or the merchant device can dynamically combine, e.g. compute an average of, the multiple distance measurements between the devices.

If no permutations remain, for each user device, the merchant device computes an averaged distance of that user device from the merchant device (580). The merchant device can use multiple computed distances for each particular user device and compute a measure of central tendency from the multiple distance measurements, e.g. an arithmetic mean, a geometric mean, a median, a mode, a minimum, a 25th percentile, or another appropriate measure. For example, an averaged distance between devices "E" and "A" can be computed using the multiple distance measurements in TABLE 1 between devices "E" and "A," or:

$$dist_{EA} = \frac{dist(E1, A) + dist(E2, A)}{2}.$$

The merchant device can also compute, for each user device, a weighted average of multiple distance computations between the user device and the merchant device, e.g. the distance computations in TABLE 1. In some implementations, the distance is weighted by one or more signal strength variability measurements used to compute the distance. The merchant device can give more weight to distances computed using very reliable signal strengths measurements, and the merchant device can give less weight to distances computed using unreliable or highly variable signal strength measurements.

In some implementations, the merchant device gives more weight to signal strength measurements of fixed devices, e.g. fixed merchant devices or fixed location beacons. For example, the merchant device can use a predetermined weight for fixed devices or apply a particular boost value to the weight of a fixed device.

For distances that were computed using multiple signal strength measurements having multiple corresponding measurements of variability, the system can combine the measures of variability in any appropriate way. In some implementations, the system chooses a maximum of the measures of variability and associates the maximum measure of variability with the determined distance. The system can also compute a measure of central tendency of the variability measurements, for example, an arithmetic or geometric mean. Thus, each computed distance can be associated with a single measure of variability.

The merchant device can then compute a weighted average as follows. For a number i of distance measurements for particular device k, each associated with a variability measure $v_i$, the merchant device can compute a sum $W_k$ of an inverse of the variability measurements according to:

$$W_k = \sum_i \frac{1}{1+v_i}.$$

The merchant device can weight each distance measurement $dist_i$ by the inverse of the variability measurements $v_i$ and compute the resulting sum $s_k$ according to:

$$s_k = \sum_i \left( dist_i \times \frac{1}{1+v_i} \right).$$

The merchant device can then compute the weighted average $dist_k$ of the distance measurements for device k by computing a ratio of $s_k$ to $W_k$ according to:

$$dist_k = \frac{s_k}{W_k}.$$

After computing the weighted average distances, the merchant device can rank the user devices by the weighted average distances, and present the ranking of the user devices on a display device associated with the merchant device.

Figure 7:
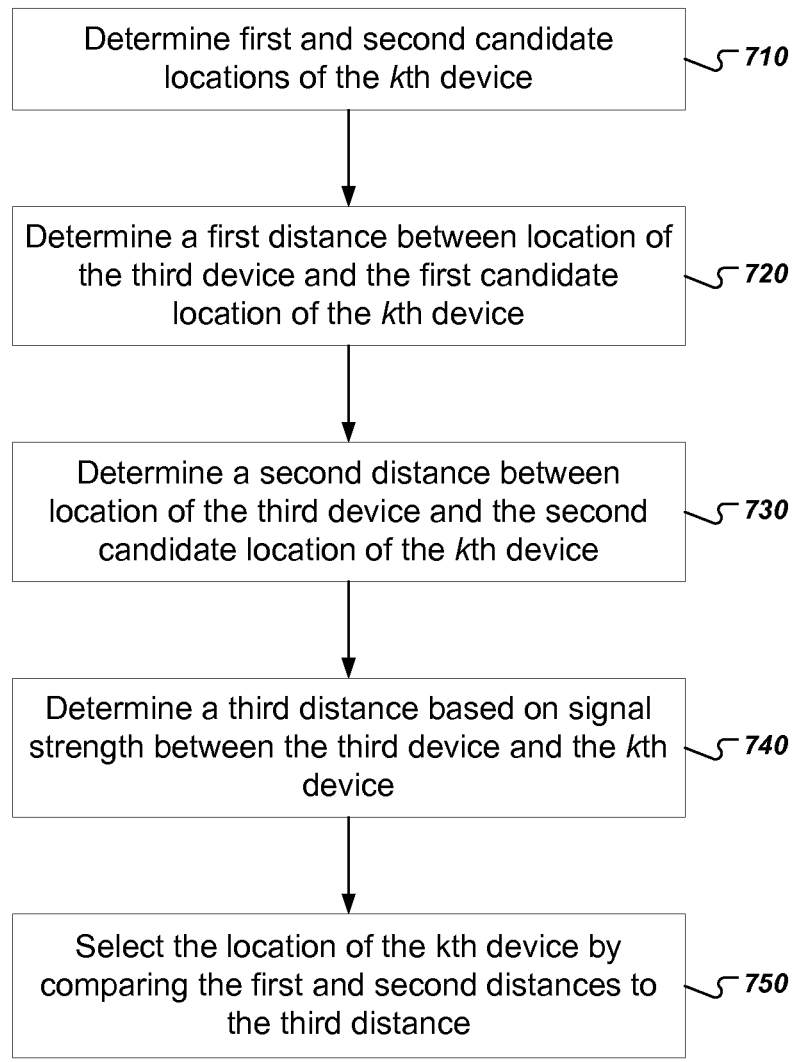
FIG. 7 is a flow chart of an example process for determining a sign of a y-coordinate of a kth device.

FIG. 7 is a flow chart of an example process for determining a sign of a y-coordinate of a kth device. With reference to FIG. 5, after selecting and computing locations for the three reference devices, the system can compute locations for the fourth through Nth devices using the following process to determine a sign for a y-coordinate of each location. In general, the merchant device compares two candidate locations for the kth device based on the two intersections of distances derived from signal measurements between the reference first device and the reference second device. The merchant device then determines which candidate location is closer to a point defined by a distance derived from a signal strength between the reference third device and the kth device.

The merchant device determines first and second candidate locations of the kth device (710). For example, the merchant device can compute distances based on signal strength between the first device and the kth device and between the second device and the kth device. The two distances will intersect at two locations that define the first and second candidate locations. One candidate location will have a positive y-coordinate, and one will have a negative y-coordinate.

Figure 8:
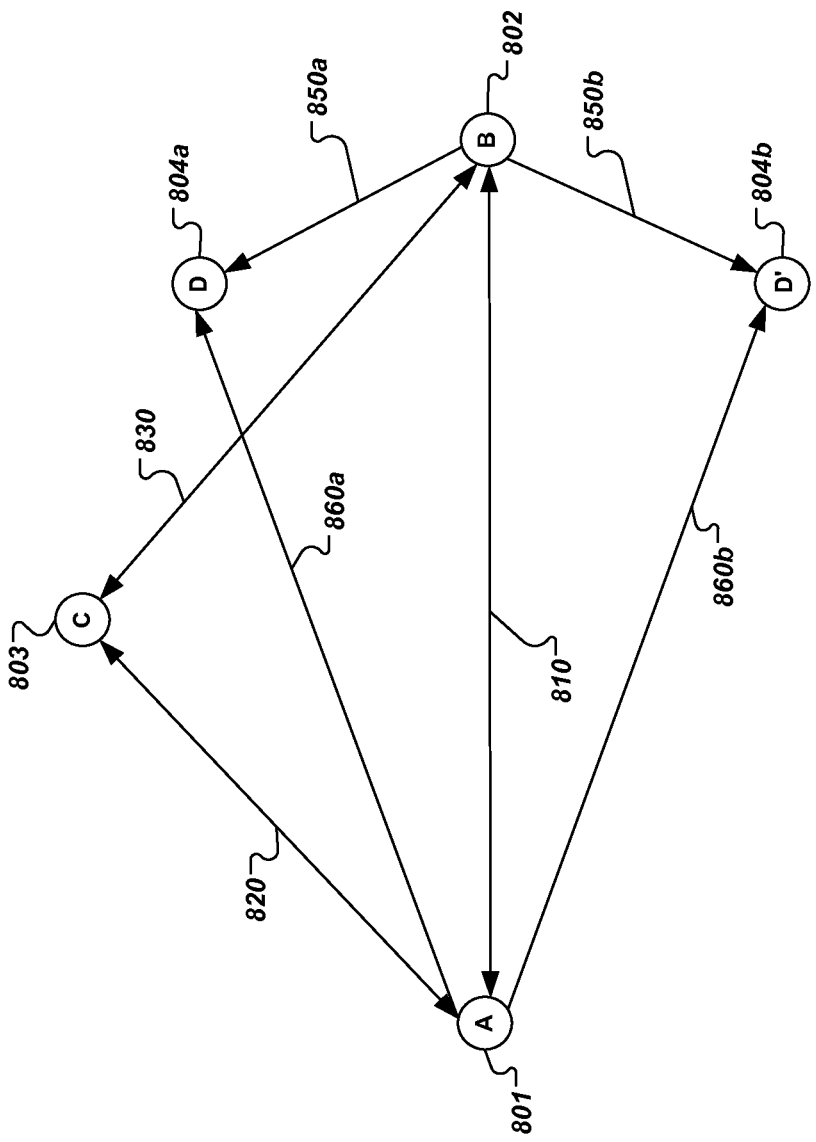
FIG. 8 is a diagram showing two candidate locations of a kth device.

FIG. 8 is a diagram showing two candidate locations of a kth device, e.g., a fourth device. In this example, the fourth device has candidate locations represented by nodes D and D'. Location 804a corresponds to a candidate location having a positive y-coordinate and is derived from the signal strength 860a between the first device at location 801 and the fourth device, and the signal strength 850a between the second device at location 802 and the fourth device. Location 804b corresponds to the same distances as location 804a, but the sign of the y-coordinate is negative.

Referring back to FIG. 7, the merchant device determines a first distance between the location of the third device 803 and the first candidate location 804a (720). The first distance $d_1$ can be given by:

$$d_1 = \sqrt{(x_{k1}-x_3)^2+(y_{k1}-y_3)^2},$$

where $(x_{k1}, y_{k1})$ is the location of the first candidate location of the fourth device and $(x_3, y_3)$ is the location of the third device.

The merchant device also determines a second distance between the location of the third device 803 and the second candidate location 804b (730). The second distance $d_2$ can be given by:

$$d_2 = \sqrt{(x_{k2}-x_3)^2+(y_{k2}-y_3)^2},$$

where $(x_{k2}, y_{k2})$ is the location of the second candidate location of the kth device and $(x_3, y_3)$ is the location of the third device.

The merchant device determines a third distance based on the signal strength between the third device and the kth device (740).

The merchant device selects the location of the kth device by comparing the first and second distances to the third distance (750). In general, the merchant device will determine which of the two candidate locations is a closer match to the signal strength between the third device and the kth device. For example, the merchant device can compute a first difference between the first distance and the third distance, as well as a second difference between the second distance and the third distance.

If the first difference is smaller than the second difference, the merchant device can determine that the first candidate location is a better match based on signal strength measured between the third and kth devices. On the other hand, if the second difference is smaller than the first difference, the merchant device can determine that the second candidate location is a better match.

The techniques described here can be used in nearly any system in which it is useful to determine the order of users or devices in a queue or to determine the relative distance of users or devices from a reference device. Additionally, user interfaces displaying the ordering or relative distances of users or devices from a reference device or location may also be used in other non-merchant systems that do not process payment transactions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
displaying, in a point-of-sale system, a listing of buyers located proximate to the point-of-sale system, the buyers including a first buyer having indicated using a first mobile device a desire to pursue a financial transaction in association with the point-of-sale system and a second buyer having indicated using a second mobile device a desire to pursue a financial transaction in association with the point-of-sale system;
determining, by the point-of-sale system, relative distances of at least the first and second mobile devices of the first and second buyers with respect to the point-of-sale system, wherein the determining comprises:
assigning a location to the first mobile device;
determining a first distance of the first mobile device from the point-of-sale device based on the location of the first mobile device;
determining a second distance of the second mobile device from the point-of-sale system based at least in part on the first location and bi-directional signal strengths between the first mobile device and the second mobile device, the bi-directional signal strengths including a first signal strength of a first signal emitted by the first mobile device and received by the second mobile device in a first direction and a second signal strength of a second signal emitted by the second mobile device and received by the first mobile device in a second direction that is opposite the first direction, the determining the second distance comprising:
determining a first candidate location of the second mobile device based on the first signal strength; and
determining a second candidate location of the second mobile device based on the second signal strength;
determining a third distance between the point-of-sale system and the second mobile device based at least in part on the first candidate location;
determining a fourth distance between the point-of-sale system and the second mobile device based at least in part on the second candidate location;
assigning a first weight to the third distance to determine a first weighted distance, the first weight being determined at least in part based on a value of signal strength variability of the first mobile device;
assigning a second weight to the fourth distance to determine a second weighted distance, the second weight being determined at least in part based on a value of signal strength variability of the second mobile device; and
determining the second distance as a weighted average distance between the point-of-sale system and the second mobile device based at least in part on the first and second weighted distances; and arranging the displayed listing in the point-of-sale system based at least in part on the determined relative distances.

2. The method of claim 1, further comprising:
receiving an indication that the first buyer has completed a purchase,
rearranging the displayed listing of the buyers in the point-of-sale system without the first buyer that has completed the purchase.

3. The method of claim 1, further comprising:
determining a location of a third mobile device based at least in part on a third signal strength between the first mobile device and the third mobile device and a fourth signal strength between the second mobile device and the third mobile device.

4. The method of claim 1, further comprising:
determining that the first mobile device is a fixed device; and
adjusting at least one of the first weight or the second weight based at least in part on determining that the first mobile device is the fixed device.

5. The method of claim 1, further comprising:
determining a fifth distance between the first location of the first mobile device and a location of a third mobile device based at least in part on a third signal strength between the first mobile device and the third mobile device and a fourth signal strength between the second mobile device and the third mobile device.

6. The method of claim 5, wherein determining the fifth distance comprises:
determining a value of a y-coordinate of the location of the third mobile device based at least in part on the third signal strength between the first mobile device and the third mobile device and the fourth signal strength between the second mobile device and the third mobile device;
determining a sixth distance between the second candidate location and one candidate location of the third mobile device having a positive y-coordinate;
determining a seventh distance between the second candidate location and another candidate location of the third mobile device having a negative y-coordinate; and
determining a sign of the y-coordinate of the location of the third mobile device based at least in part on comparing the sixth distance and the seventh distance.

7. A point-of-sale system comprising:
a display; and
one or more processors; and
one or more storage devices storing instructions that are operable, when executed by the one or more processors, to cause the one or more processors to perform operations comprising:
identifying a first customer having a first mobile device and a second customer having a second mobile device;
determining respective distances between each of the first mobile device and the second mobile device and the point-of-sale system, the determining comprising:
assigning a location to the first mobile device;
determining a first distance of the first mobile device from the point-of-sale system based on the location of the first mobile device; determining a second distance of the second mobile device from the point-of-sale device based at least in part on the first location and bi-directional signal strengths between the first mobile device and the second mobile device, the bi-directional signal strengths including a first signal strength of a first signal emitted by the first mobile device and received by the second mobile device in a first direction and a second signal strength of a second signal emitted by the second mobile device and received by the first mobile device in a second direction that is opposite the first direction, the determining the second distance comprising:
determining a first approximate location of the second mobile device based on the first signal strength; and
determining a second approximate location of the second mobile device based on the second signal strength;
determining a third distance between the point-of-sale system and the second mobile device based at least in part on the first approximate location;
determining a fourth distance between the point-of-sale system and the second mobile device based at least in part on the second approximate location;
assigning a first weight to the third distance to determine a first weighted distance, the first weight being determined at least in part based on a value of signal strength variability of the first mobile device;
assigning a second weight to the fourth distance to determine a second weighted distance, the second weight being determined at least in part based on a value of signal strength variability of the second mobile device; and
determining the second distance as a weighted average distance between the point-of-sale system and the second mobile device based at least in part on the first and second weighted distances; and providing, on the display, a ranking of the first and second customers according to the respective distances.

8. The system of claim 7, wherein each of the first and second customers have checked in to indicate their desire to pursue a purchase transaction with the point-of-sale system.

9. The system of claim 7, wherein each of the first and second customers are located within a threshold distance of the point-of-sale system.

10. The system of claim 7, the operations further comprising:
determining a location of a third mobile device based at least in part on a third signal strength between the first mobile device and the third mobile device and a fourth signal strength between the second mobile device and the third mobile device.

11. The system of claim 7, wherein the operations further comprise:
determining that the first mobile device is a fixed device; and
adjusting at least one of the first weight or the second weight based at least in part on determining that the first mobile device is the fixed device.

12. The system of claim 7, wherein the operations further comprise:
determining a fifth distance between the first location of the first mobile device and a location of a third mobile device based at least in part on a third signal strength between the first mobile device and the third mobile device and a fourth signal strength between the second mobile device and the third mobile device.

13. The system of claim 12, wherein determining the fifth distance comprises:
determining a value of a y-coordinate of the location of the third mobile device based at least in part on the third signal strength between the first mobile device and the third mobile device and the fourth signal strength between the second mobile device and the third mobile device;
determining a sixth distance between the second approximate location and one candidate location of the third mobile device having a positive y-coordinate;
determining a seventh distance between the second candidate location and another candidate location of the third mobile device having a negative y-coordinate; and
determining a sign of the y-coordinate of the location of the third mobile device based at least in part on comparing the sixth distance and the seventh distance.

14. One or more storage devices storing instructions that are operable, when executed by one or more processors, to cause the one or more processors to perform operations comprising
displaying, in a point-of-sale system, a listing of buyers located proximate to the point-of-sale system, the buyers including a first buyer having indicated using a first mobile device a desire to pursue a financial transaction in association with the point-of-sale system and a second buyer having indicated using a second mobile device a desire to pursue a financial transaction in association with the point-of-sale system;
determining, by the point-of-sale system, relative distances of at least the first and second mobile devices of the first and second buyers with respect to the point-of-sale system, wherein the determining comprises:
assigning a location to the first mobile device;
determining a first distance of the first mobile device from the point-of-sale device based on the location of the first mobile device;
determining a second distance of the second mobile device from the point-of-sale system based at least in part on the first location and bi-directional signal strengths between the first mobile device and the second mobile device, the bi-directional signal strengths including a first signal strength of a first signal emitted by the first mobile device and received by the second mobile device in a first direction and a second signal strength of a second signal emitted by the second mobile device and received by the first mobile device in a second direction that is opposite the first direction, the determining the second distance comprising:
determining a first candidate location of the second mobile device based on the first signal strength; and
determining a second candidate location of the second mobile device based on the second signal strength;
determining a third distance between the point-of-sale system and the second mobile device based at least in part on the first candidate location;
determining a fourth distance between the point-of-sale system and the second mobile device based at least in part on the second candidate location;
assigning a first weight to the first distance to determine a first weighted distance, the first weight being determined at least in part based on a value of signal strength variability of the first mobile device;
assigning a second weight to the second distance to determine a second weighted distance, the second weight being determined at least in part based on a value of signal strength variability of the second mobile device; and
determining the second distance as a weighted average distance between the point-of-sale system and the second mobile device based at least in part on the first and second weighted distances; and
arranging the displayed listing in the point-of-sale system based at least in part on the determined relative distances.

15. The one or more storage devices of claim 14, wherein the operations further comprises:

receiving an indication that the first buyer has completed a purchase,
rearranging the displayed listing of the buyers in the point-of-sale system without the first buyer that has completed the purchase.

16. The one or more storage devices of claim 14, wherein the operations further comprises:

determining a location of a third mobile device based at least in part on a third signal strength between the first mobile device and the third mobile device and a fourth signal strength between the second mobile device and the third mobile device.

17. The one or more storage devices of claim 14, wherein the operations further comprises:

determining that the first mobile device is a fixed device; and
adjusting at least one of the first weight or the second weight based at least in part on determining that the first mobile device is the fixed device.

18. The one or more storage devices of claim 14, wherein the operations further comprises:

determining a fifth distance between the first location of the first mobile device and a third location of a third mobile device based at least in part on a third signal strength between the first mobile device and the third mobile device and a fourth signal strength between the second mobile device and the third mobile device.

19. The one or more storage devices of claim 18, wherein determining the fifth distance comprises:

determining a value of a y-coordinate of the location of the third mobile device based at least in part on the third signal strength between the first mobile device and the third mobile device and the fourth signal strength between the second mobile device and the third mobile device;
determining a sixth distance between the second candidate location and one candidate location of the third mobile device having a positive y-coordinate;
determining a seventh distance between the second candidate location and another candidate location of the third mobile device having a negative y-coordinate; and
determining a sign of the y-coordinate of the location of the third mobile device based at least in part on comparing the sixth distance and the seventh distance.

20. The method of claim 1, wherein the first weight is determined based on an inverse of the value of the signal strength variability of the first mobile device and the second weight is determined based on an inverse of the value of the signal strength variability of the second mobile device.

* * * * *